Particle Size Distribution of Cement Ground with Phenol

Particle Size Distribution of Cement Ground without Phenol

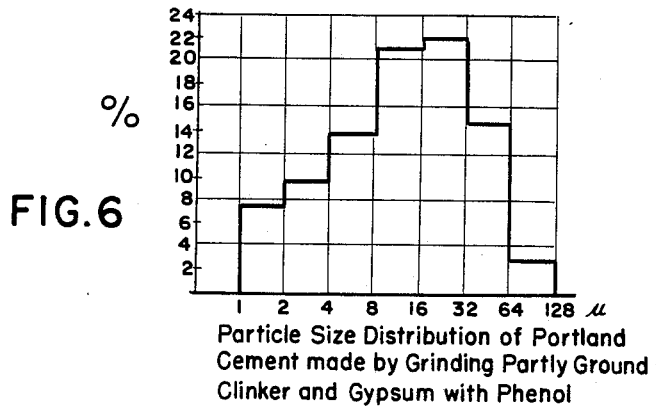
FIG.6 Particle Size Distribution of Portland Cement made by Grinding Partly Ground Clinker and Gypsum with Phenol
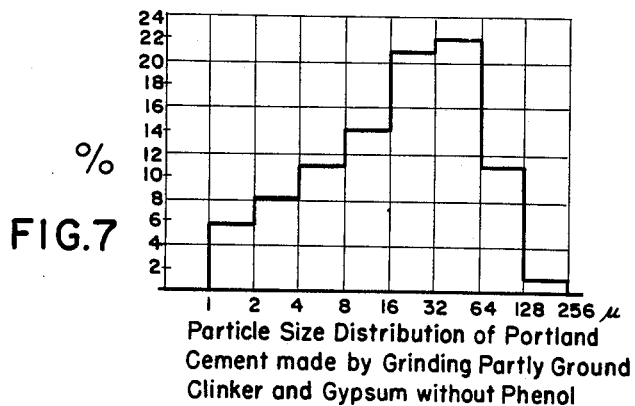
FIG.7 Particle Size Distribution of Portland Cement made by Grinding Partly Ground Clinker and Gypsum without Phenol

United States Patent Office 3,068,110
Patented Dec. 11, 1962

3,068,110
METHOD OF GRINDING PORTLAND CEMENT USING A PHENOLIC COMPOUND AS A GRINDING AID
Gunnar Rindal Fagerholt, Copenhagen-Valby, Denmark, assignor to F. L. Smidth & Co., New York, N. Y., a corporation of Delaware
Filed Apr. 20, 1960, Ser. No. 23,538
Claims priority, application Great Britain Apr. 22, 1959
7 Claims. (Cl. 106—102)

This invention relates to the grinding of crystalline materials of the class consisting of cement, cement clinker, and gypsum in a mill containing a charge of grinding bodies and is concerned more particularly with a method of grinding such materials in which a novel grinding aid is employed. The use of the new grinding aid improves the grinding operation, in that it inhibits the fine particles from clinging together and forming coatings on the grinding bodies. As a result, the oversize pieces are more readily reduced in size without further grinding of the fine particles and the desired fineness is thus obtained at a much earlier stage in the grinding operation than heretofore. A consequent reduction in power consumption and in time required for the grinding operation is, accordingly, obtained and it is possible by the use of the method of grinding involving the new grinding aid to grind the material to a higher degree of fineness in a given time and to obtain a more uniform grain size.

In the commercial grinding or a mixture of gypsum and cement clinker to produce cement and in the further grinding of the cement, the energy required increases directly with the fineness of the cement and, when the clinker is reduced to abnormally fine particles, the energy required becomes disproportionately high. Microscopic investigations have shown that the disproportionate energy consumption is caused by the tendency of the fine particles to cling together and to build up a coating on the grinding bodies and on the walls of the mill and a similar coating is formed on the large pieces of material and protects them from the action of the grinding bodies. The result of the action of the fine particles described causes such particles to be ground to an excessive degree while coarser particles remain unground.

The tendency of the very fine particles to cling together and form coatings in the grinding of cement and similar crystalline materials is believed to be the result of the breaking down of the lattice system of the minerals with the result that "residual valence" forces act on the surface of the powder particles. Such forces produce an attraction between particles which becomes more pronounced as the fineness of the powder increases.

It has been found that the addition of some substances to crystalline materials being ground facilitates the grinding and inhibits the fine particles from clinging together and forming coatings. Such substances are known as grinding aids and they are thought to neutralize the residual valence forces at the surface of the particles. While many substances have been used as grinding aids, those heretofore known are relatively costly and this is a serious objection to their use in the grinding of cement which is a cheap commodity with a price sensitive to increased cost of manufacture.

The present invention is, accordingly, directed to the provision of a method of grinding crystalline materials of the class consisting of cement, cement clinker, and gypsum, in which use is made of a novel grinding aid in the form of a phenolic compound. By the term "phenolic compound," I intend to be understood as referring to phenol proper, poly-phenols, in which there is more than one hydroxyl group in the benzene ring, and also phenols having one or more methyl substituents in the ring as, for example, cresol and xylenol, but otherwise unsubstituted. Such phenolic compounds are relatively cheap and they compare favorably with the grinding aids hitherto used in effectiveness.

For a better understanding of the invention, reference may be made to the accompanying drawings, in which FIG. 1 is a graph containing curves showing the strength of specimens of cements produced by prior methods of grinding and by the method of the invention as a function of grinding time;

Figure 4:
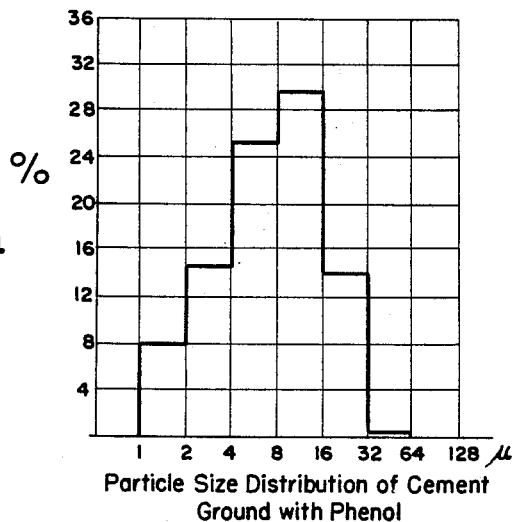
Figure 5:
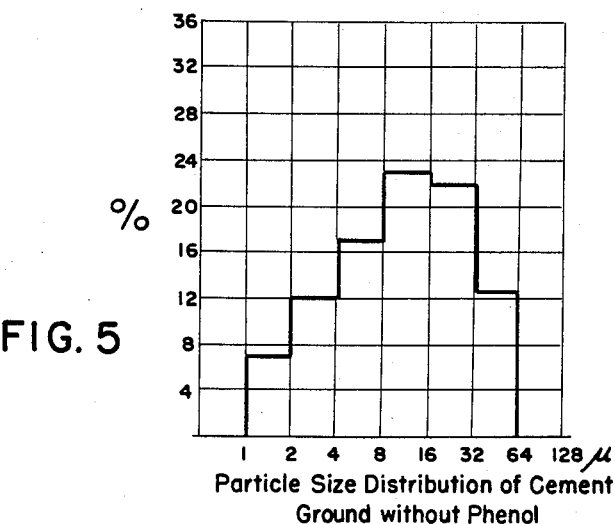

FIGS. 4 and 5 are graphs containing diagrams showing the particle size distribution in cements ground by a prior method of grinding and by the method of the invention, respectively; and FIGS. 6 and 7 are graphs containing diagrams showing the particle size distribution in Portland cements produced by grinding partly ground clinker and gypsum by the method of the invention and by a prior method of grinding, respectively.

In the practice of the method of grinding of the invention, the amount of the phenolic compound required is a small proportion of the weight of the material being ground. Improved results are obtained when the compound employed amounts to as little as 0.01% by weight of the material being ground but it is preferable to use an amount of the compound ranging up to 0.25% by weight of the material being ground, the amount of the compound used increasing with the increased fineness of the ground product desired. Little additional improvement is obtained when the amount of the compound exceeds 0.25% by weight of the material.

To show the effectiveness of the phenolic compounds as grinding aids, comparative tests were carried out, in which quantities of ground Portland cement were further ground with varying amounts of phenol used as a grinding aid and like quantities of the cement were further ground making use of similar amounts of the well known grinding aid triethanolamine. The grinding operations were carried out in a laboratory mill of an inside diameter and a length of about 11" and, in the tests, the mill was operated at 54 r.p.m. with a charge of 39.6 lbs. of cylindrical grinding bodies ⅝" long and ⅝" in diameter and 3.96 lbs. of Portland cement. The grinding operations were carried out for the same length of time and at the conclusion of each operation, the percentage of flour, that is, of particles smaller than 20 microns, was determined by separation of the product in a flour-meter. Also, the Blaine technique was used to determine the Blaine surface of the product, that is, the ratio of a unit of surface area of the product to its density.

The result of the tests are set forth in Tables 1 to 4, inclusive, as follows. In the grinding operation, the phenol was added in the form of a solution in an equal weight of ethyl alcohol and the quantities of phenol given in the tables are quantities of the solution and are thus twice the dry weight of the phenol.

TABLE 1

*Proportion of Flour After Grinding With Triethanolamine*

| Duration of grinding, min. | Quantity of triethanolamine added | | | | |
|---|---|---|---|---|---|
| | 0.0% | 0.025% | 0.1% | 0.2% | 0.4% |
| 0 | 55.2 | 55.2 | 55.2 | 55.2 | 55.2 |
| 5 | 58.2 | 60.0 | 60.0 | 57.8 | 62.4 |
| 10 | 61.0 | 64.4 | 62.0 | 63.6 | 62.4 |
| 20 | 66.0 | 70.2 | 69.8 | 70.2 | 67.8 |
| 40 | 70.8 | 77.6 | 83.4 | 83.6 | 81.0 |
| 80 | 77.6 | 82.2 | 91.8 | 94.6 | 95.6 |

TABLE 2

*Blaine Surface ($cm.^2/g.$) After Grinding With Triethanolamine*

| Duration of grinding, min. | Quantity of triethanolamine added | | | |
|---|---|---|---|---|
| | 0.0% | 0.025% | 0.1% | 0.4% |
| 0 | 2,600 | 2,600 | 2,600 | 2,600 |
| 5 | 2,910 | 2,970 | 2,865 | 2,820 |
| 10 | 3,040 | 3,160 | 3,140 | 3,010 |
| 20 | 3,410 | 3,530 | 3,665 | 3,350 |
| 40 | 3,990 | 4,210 | 4,340 | 4,010 |
| 80 | 4,650 | 5,110 | 5,100 | 5,500 |

TABLE 3

*Percentage of Flour After Grinding With Phenol*

| Duration of grinding, min. | Quantity of 50% solution of phenol added | | | | |
|---|---|---|---|---|---|
| | 0% | 0.025% | 0.1% | 0.2% | 0.4% |
| 0 | 55.2 | 55.2 | 55.2 | 55.2 | 55.2 |
| 5 | 58.2 | 57.2 | 60.2 | 58.8 | 58.0 |
| 10 | 61.0 | 60.4 | 64.4 | 64.0 | 62.4 |
| 20 | 66.0 | 67.8 | 73.1 | 73.0 | 71.6 |
| 40 | 70.8 | 72.4 | 82.4 | 84.2 | 85.6 |
| 80 | 77.6 | 76.0 | 86.2 | 94.8 | 97.2 |

TABLE 4

*Blaine Surface ($cm.^2/g.$) After Grinding With Phenol*

| Duration of grinding, min. | Quantity of 50% solution of phenol added | | | | |
|---|---|---|---|---|---|
| | 0% | 0.025% | 0.1% | 0.2% | 0.4% |
| 0 | 2,600 | 2,600 | 2,600 | 2,600 | 2,600 |
| 5 | 2,910 | 3,015 | 2,900 | 2,920 | 2,870 |
| 10 | 3,040 | 3,260 | 3,150 | 3,170 | 3,200 |
| 20 | 3,410 | 3,650 | 3,450 | 3,570 | 3,560 |
| 40 | 3,990 | 3,940 | 4,240 | 4,290 | 4,300 |
| 80 | 4,650 | 5,280 | 5,330 | 5,410 | 5,760 |

A comparison of Tables 1 and 3 shows that, when no grinding aid was used, the amount of flour increased from 55.2% present in the starting material to 77.6% in the ground product after 80 minutes of grinding. When an amount of triethanolamine equal to 0.4% of the weight of the starting material was used as a grinding aid, the proportion of flour in the ground product increased from 77.6% to 95.6%. When an amount of the 50% phenol solution equal to 0.4% of the weight of the starting material, that is, an amount of phenol equal to 0.2% of the starting material, was used as a grinding aid in a grinding operation 80 minutes long, the proportion of flour in the ground product increased from 77.6 to 97.2%.

A comparison of Tables 2 and 4 shows that the Blaine surface increased from 4650 $cm.^2/g.$ in the ground product produced without a grinding aid to 5500 $cm.^2/g.$ in the product ground with the use of triethanolamine and from 4650 to 5760 $cm.^2/g.$, when phenol was used as a grinding aid.

The Blaine surface and the proportion of flour in the ground product are useful indications of the efficiency of a grinding process but they are only secondary criteria with respect to the usefulness of the cement produced. This quality of the cement is indicated by the strength of the cement after different hardening times and depends in part on the particle size distribution of the cement powder.

To show that the quality of cement is improved by the use of phenol as an aid during grinding, two series of tests were carried out. In the first series, 2% by weight of raw gypsum was added to ordinary Portland cement and quantities of the mixture were ground for 10, 20, 40 and 80 minutes, respectively, without the use of phenol. In the second series of tests, like quantities of the same mixture were ground for similar lengths of time with the addition of varying amounts of a mixture consisting of 1 part of phenol, ½ part of ethyl alcohol, and ½ part of water by weight. The amounts of the liquid added were such that the quantities of phenol expressed in percentages by weight of the mixture being ground were as follows for different grinding times: for 10 minutes, 0.02%; for 20 minutes, 0.04%; for 40 minutes, 0.075%; and for 80 minutes, 0.150%. In the 80 minute grinding operation, half the phenol was added at the start of the operation and half was added after 40 minutes.

The strength of the cement after 1, 3, 7 and 28 days was determined by the conventional method, two specimens of each of the ground products in the two series being tested.

Figure 1:
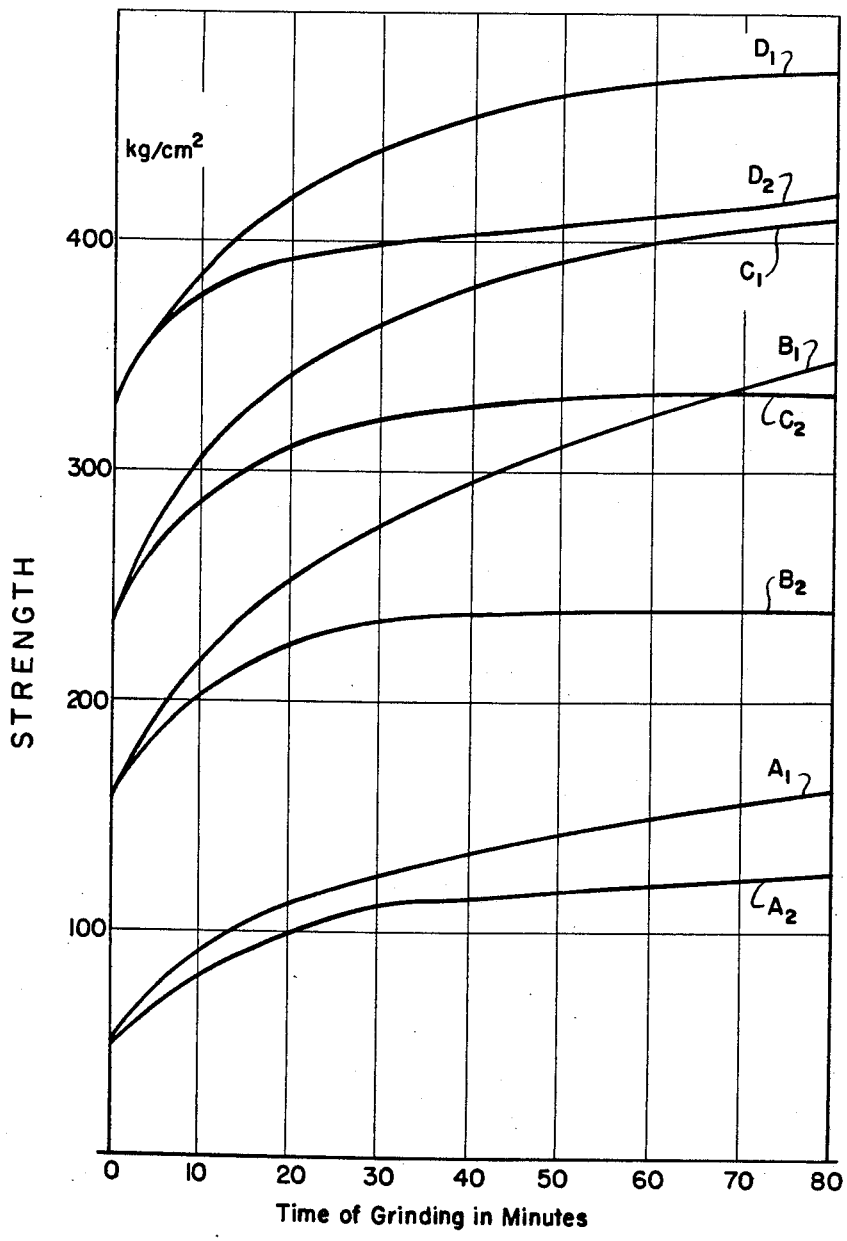

The results of the strength tests have been plotted as curves appearing in FIG. 1. Of these curves, the curve $A_1$ indicates the strength after one day of cement ground with phenol for varying lengths of time, while the curve $A_2$ shows the strength after one day of similar cement ground for like periods of time without the addition of phenol. As will be apparent, the strength of the cement ground with phenol increases faster than the strength of the cement ground without phenol and the strength of cement ground with phenol reaches a higher value than that ground without phenol.

The curves $B_1$ and $B_2$, $C_1$ and $C_2$, and $D_1$ and $D_2$ are analogous to the curves $A_1$ and $A_2$ and indicate the strength after 3, 7, and 28 days, respectively, of cement ground for varying lengths of time with and without the addition of phenol.

Figure 2:
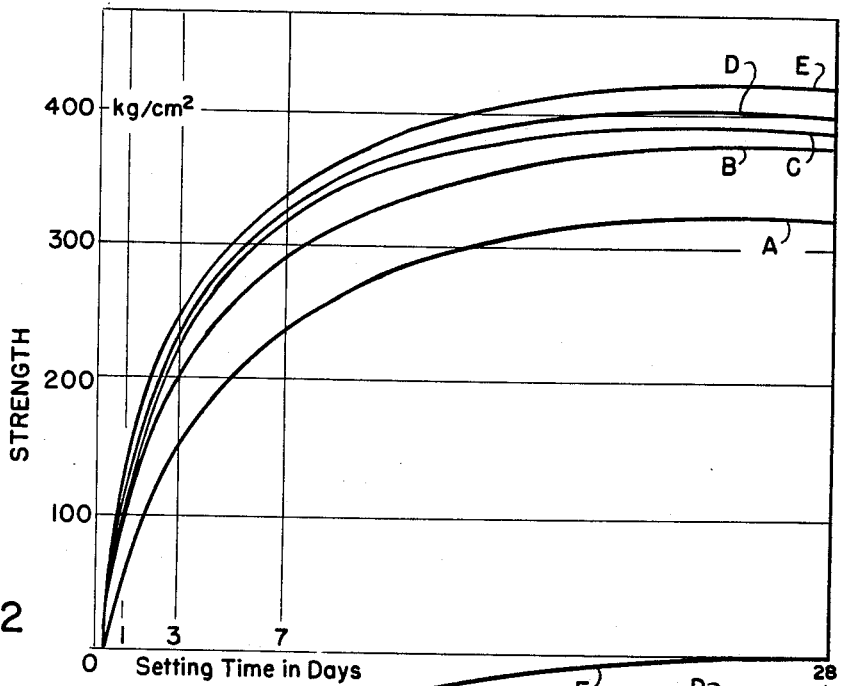
FIG. 2 is a graph containing curves showing the strength of specimens of cements produced by prior methods of grinding as a function of setting time.

The curves of FIG. 2 show the strength of cement as a function of the setting time, when no grinding aid is used. Curve A shows the strength of the starting material during a setting time up to 28 days while curves B, C, D, and E show the strength during a like period of the material ground without a grinding aid for 10, 20, 40, and 80 minutes, respectively.

Figure 3:
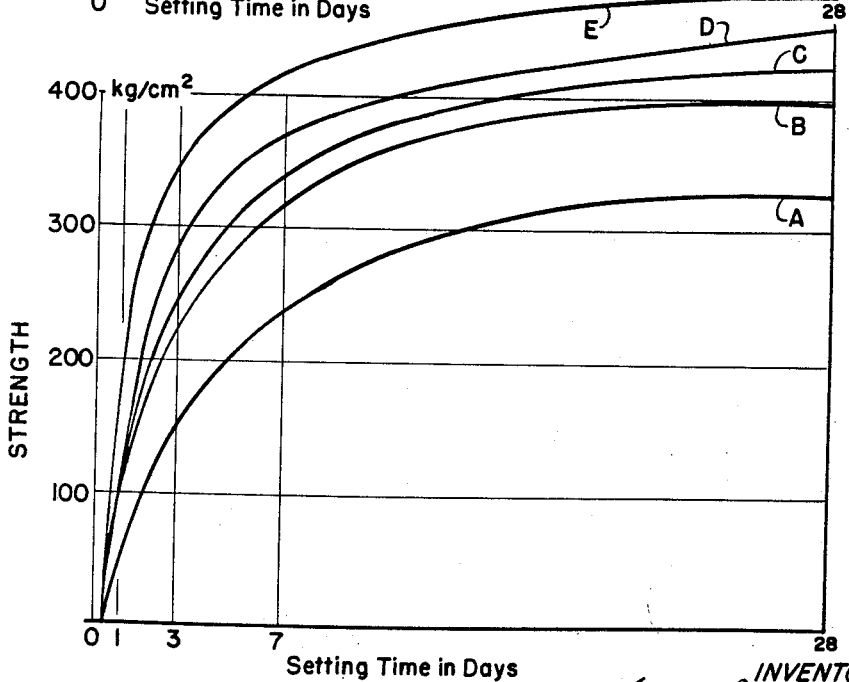
FIG. 3 is a graph containing curves showing the strength of specimens of cements made by the method of the invention as a function of setting time.

The curve A of FIG. 3 is the same as the curve A of FIG. 2, while curves B, C, D, and E of FIG. 3 show the strength during a setting time up to 28 days of the starting material ground for 10, 20, 40, and 80 minutes, respectively, with phenol as a grinding aid. A comparison of the curves of FIG. 3 with the corresponding curves of FIG. 2 show a more rapid increase in strength and a greater total strength in the case of the cement ground with phenol as a grinding aid.

The particle size distributions of cement ground for 80 minutes with and without phenol are shown in FIGS. 4 and 5, respectively, and a comparison of the figures shows that the particles are more uniform in size when the cement is ground with phenol as a grinding aid.

The increased uniformity of particle size obtainable in the grinding of clinker gries, that is, partly ground clinker having particles of a size passing a 1 mm. sieve, to ordinary Portland cement is shown by a comparison of FIGS. 6 and 7. Separate quantities of the gries were mixed with 4% by weight of gypsum and ground for 80 minutes with phenol used in one grinding operation and not in the other. The particle distribution in the product ground with the aid of phenol is shown in FIG. 6 while FIG. 7 shows the particle distribution in the product ground without phenol. The increased uniformity in particle size obtained by the use of phenol is apparent from a comparison of the figures.

The test results above set forth demonstrate the efficiency of phenol as a grinding aid in the grinding of cement to very fine particle sizes, as in the later stages of the grinding of high early strength cement, and also show that the phenolic compounds are useful in the grinding of cement clinker to ordinary Portland cement. In such grinding operations, in which a phenolic compound is used, it may be introduced into the mill in the form of a powder or of a solution by conventional means, such as a feeder or a sprayer, and the compound may be introduced through the inlet or the outlet of the mill. In the batch grinding of cement or clinker, the phenol may be introduced into the mill with the initial charge or it may be introduced at an intermediate stage of the grinding when the coating action of the particles is beginning to take place. In a continuous grinding operation, the phenol in either solid or solution form is introduced into the mill from time to time as required.

I claim:

1. A method of grinding crystalline materials of the class consisting of cement, cement clinker, and gypsum which comprises introducing the materials into a mill with a charge of loose grinding bodies, introducing into the mill at least one member of the class, consisting of phenol, poly-phenols having more than one hydroxyl group in the benzene ring, and phenols having at least one methyl substituent in the benzene ring but otherwise unsubstituted, in an amount ranging from 0.01% to about 0.25 of the weight of the materials being ground, and operating the mill.

2. The method of claim 1, in which phenol is introduced into the mill.

3. The method of claim 1, in which cresol is introduced into the mill.

4. The method of claim 1, in which xylenol is introduced into the mill.

5. The method of claim 1, in which a solution containing the member of the stated class is introduced into the mill.

6. The method of claim 1, in which the member of the stated class is introduced into the mill at the start of the grinding operation.

7. The method of claim 1, in which the member of the stated class is introduced into the mill after the grinding operation is partially completed.

References Cited in the file of this patent

UNITED STATES PATENTS

| | | |
|---|---|---|
| 2,061,774 | Olson | Nov. 24, 1936 |
| 2,238,540 | Sourwine | Apr. 15, 1941 |
| 2,360,519 | Scripture | Oct. 17, 1944 |
| 2,397,886 | Scripture | Apr. 2, 1946 |